United States Patent
Culler

(10) Patent No.: US 6,545,666 B1
(45) Date of Patent: Apr. 8, 2003

(54) DEVICES, SYSTEMS AND METHODS FOR POSITIONING CURSOR ON DISPLAY DEVICE

(75) Inventor: Jason H. Culler, Livermore, CO (US)

(73) Assignee: Agilent Technologies, Inc., Palo Alto, CA (US)

(*) Notice: Subject to any disclaimer, the term of this patent is extended or adjusted under 35 U.S.C. 154(b) by 282 days.

(21) Appl. No.: 09/580,697

(22) Filed: May 30, 2000

(51) Int. Cl.[7] .............................. G09G 5/00; G09G 5/08
(52) U.S. Cl. ...................... 345/168; 345/163; 345/156
(58) Field of Search .............................. 345/156–172, 345/856–862; 341/26

(56) References Cited

U.S. PATENT DOCUMENTS

| | | | |
|---|---|---|---|
| 5,189,403 A | * 2/1993 | Franz et al. | 345/168 |
| 5,198,802 A | * 3/1993 | Bertram et al. | 345/163 |
| 5,485,614 A | * 1/1996 | Kocis et al. | 341/22 |
| 5,565,887 A | * 10/1996 | McCambridge et al. | 345/163 |
| 5,585,823 A | * 12/1996 | Duchon et al. | 345/157 |
| 5,608,895 A | * 3/1997 | Lee | 345/163 |
| 5,642,131 A | * 6/1997 | Pekelney et al. | 345/862 |
| 5,669,015 A | * 9/1997 | Chidester et al. | 710/73 |
| 5,805,161 A | * 9/1998 | Tiphane | 345/663 |
| 6,100,875 A | * 8/2000 | Goodman et al. | 345/159 |
| 6,181,325 B1 | * 1/2001 | Lee | 345/156 |
| 6,323,842 B1 | * 11/2001 | Krukovsky | 345/156 |
| 6,339,440 B1 | * 1/2002 | Becker et al. | 345/157 |

FOREIGN PATENT DOCUMENTS

EP   525799 A1 * 2/1993 ......... G06F/03/023

* cited by examiner

Primary Examiner—Steven Saras
Assistant Examiner—Michael Moyer

(57) ABSTRACT

Devices, systems and methods for positioning a cursor on a display device are provided. For example, an input device is provided which includes a stepper device configured to electrically communicate with a computer. The stepper device incorporates a stepper-enable switch configured to prevent movement information provided by a mouse-type input device from influencing movement of a cursor on a display device and to enable functional information, provided by the mouse-type input device, to provide selected functionality of the cursor. A plurality of cursor repositioning keys also are provided and are configured to reposition the cursor when movement information provided by the mouse-type input device is prevented from influencing movement of the cursor on the display device.

13 Claims, 5 Drawing Sheets

DEVICES, SYSTEMS AND METHODS FOR POSITIONING CURSOR ON DISPLAY DEVICE

BACKGROUND OF THE INVENTION

1. Field of the Invention

The present invention generally relates to input devices for computers and, in particular, to devices, systems and methods for positioning a cursor on a display device of a computer-based system.

2. Description of the Related Art

With the use of large and multi-head display devices becoming ever more prevalent, computer operators, such as graphic and CAD designers, for example, are experiencing difficulties interfacing with computer applications displayed on the display devices when utilizing conventional mouse-type input devices. More specifically, computer operators are finding it difficult to utilize the increased display area provided by the larger and multi-head displays without experiencing a characteristic of cursor movement about the display known as "mouse twitch" or "jump."

As utilized herein, "twitch" or "jump" is defined as the tendency of a mouse-driven cursor to move in a manner not desired by the operator. For instance, twitch may occur when the operator attempts to actuate a function of a mouse-type input device, such as by depressing an actuator or button of the mouse. Movement of the cursor during an actuation of a mouse function may occur when the cursor is in a location on the display device that is not designated by one of a predetermined number of grid points. For instance, when the cursor is located at a non-grid point and a mouse function is actuated, typically, the cursor will tend to move, i.e., twitch or jump, to the grid point closest to the cursor's current location. Movement of the cursor during an actuation of a mouse function also may occur due to inadvertent movement of the mouse during such actuation. Additionally, when an operator utilizes large or multi-head display devices, typically, the operator selects speed/sensitivity settings for the mouse that allow a small movement of the mouse to correspond to a relatively large movement of the associated cursor across the display area(s). However, many operations, such as CAD operations, oftentimes require the use of precise (small) cursor movements which are not easily accommodated by the aforementioned operator-selected speed/sensitivity settings of the mouse.

Heretofore, in an effort to avoid mouse twitch or jump, computer operators typically change mouse speed and/or sensitivity settings for a mouse-type input device when switching between various computer applications and/or displays. Thus, it is not uncommon for a computer operator to switch mouse speed and/or sensitivity settings when switching from applications such as word processing, or other text-based applications, for example, to a graphic-based application, such as CAD, for instance, or even from one CAD function to another. However, since each change of mouse speed and/or sensitivity settings takes time, the efficiency of the computer operator may be reduced in proportion to the number of changes made.

Therefore, there is a need for improved devices, systems and methods which address these and other shortcomings of the prior art.

SUMMARY OF THE INVENTION

Briefly described, the present invention relates to input devices for computers and, in particular, to devices, systems and methods for positioning a cursor on a display device of a computer-based system. Such a computer-based system is adapted to facilitate operation of a computer application which displays a cursor within a display area of a display device of a computer. Typically, the computer includes a mouse-type input device for providing movement information and functional information corresponding to the cursor so that the cursor is movable about the display area in response to the movement information and is adapted to provide selected functionality in response to the functional information.

In a preferred embodiment of the present invention, an input device is provided which includes a stepper device configured to electrically communicate with the computer. The stepper device incorporates a stepper-enable switch configured to prevent movement information, provided by the mouse-type input device, from influencing movement of the cursor on the display device and to enable functional information, provided by the mouse-type input device, to provide selected functionality of the cursor. A plurality of cursor repositioning keys also are provided and are configured to reposition the cursor when movement information provided by the mouse-type input device is prevented from influencing movement of the cursor on the display device.

In another embodiment, an input device is provided for interfacing with a computer application. Preferably, the input device includes means for preventing movement information, provided by a mouse-type input device, from influencing movement of a cursor on the display device and for enabling functional information, provided by the mouse-type input device, to provide selected functionality of the cursor. Additionally, means for repositioning the cursor without utilizing the mouse-type input device is provided.

In another embodiment, a computer system for operating a computer application is provided. Preferably, the computer system includes a display device, a mouse-type input device and a stepper device. The mouse-type input device is configured to provide a user-interface with the computer application so that a cursor is movable about the display area of the display device in response to movement information of the mouse-type input device, and is configured to provide selected functionality to the cursor in response to functional information of the mouse-type input device. The stepper device electrically communicates with the computer and includes a stepper-enable switch which, when actuated, prevents movement information, provided by the mouse-type input device, from influencing movement of the cursor while enabling functional information, provided by the mouse-type input device, to provide selected functionality of the cursor.

In still another embodiment, a computer readable medium incorporating a computer program for interfacing with a computer application is provided. Preferably, the computer readable medium includes: logic configured to prevent movement information provided by the mouse-type input device from influencing movement of the cursor on the display device; logic configured to reposition the cursor without utilizing the mouse-type input device, and; logic configured to enable functional information, provided by the mouse-type input device, to provide selected functionality of the cursor.

Embodiments of the present invention also may be construed as providing a method for interfacing with a computer application. In a preferred embodiment, a method for interfacing with a computer application includes the steps of: preventing movement information, provided by the mouse-type input device, from influencing movement of the cursor on the display device; repositioning the cursor without utilizing the mouse-type input device, and; enabling functional information, provided by the mouse-type input device, to provide selected functionality of the cursor.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF THE PREFERRED EMBODIMENT

Figure 1:
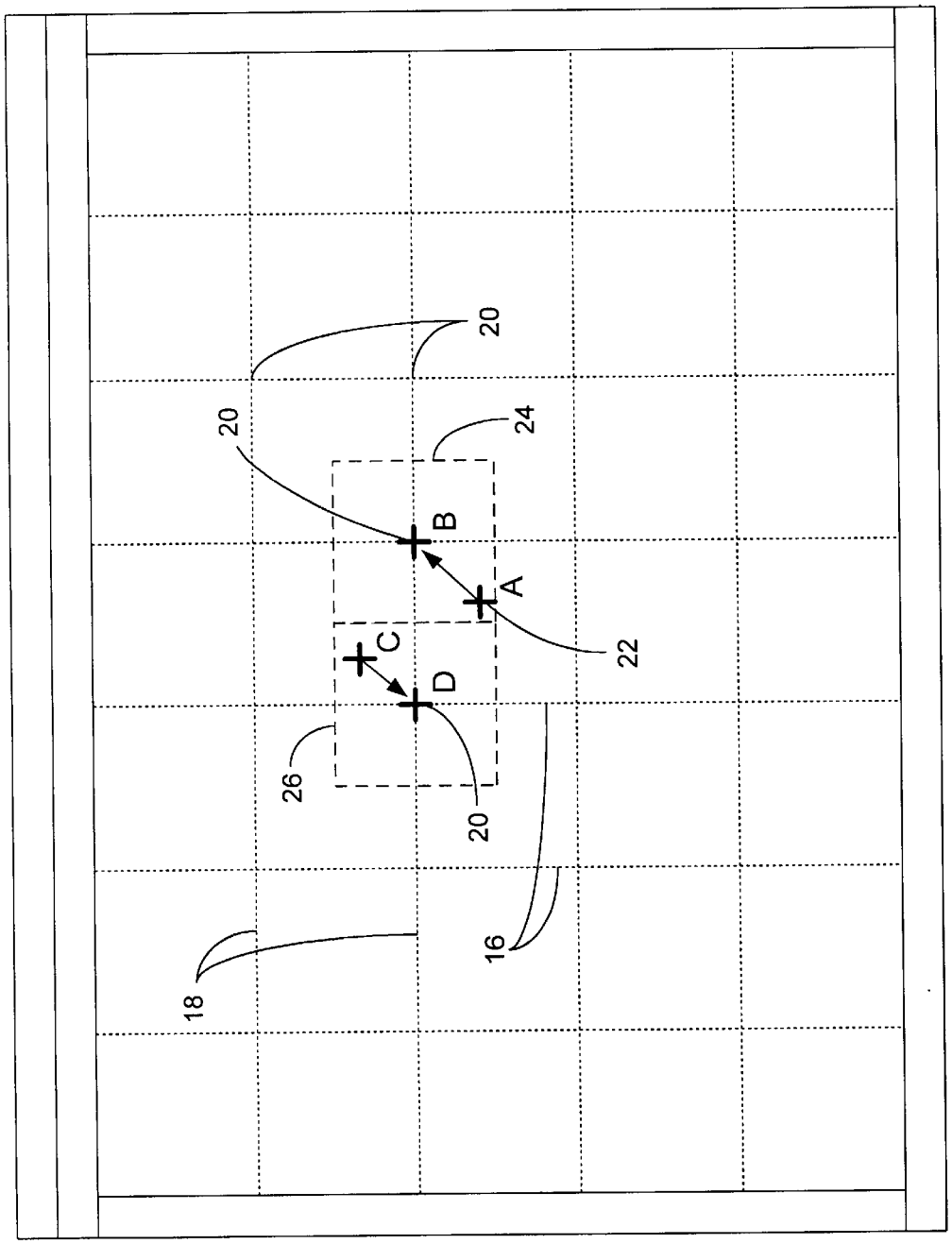
FIG. 1 is a diagram depicting mouse twitch or jump.

Reference will now be made in detail to the description of the invention as illustrated in the drawings with like numerals indicating like parts throughout the several views. As is known, a display device, e.g., a computer monitor, is configured for displaying graphical information provided by a processor-based system. For instance, a display device may be configured for presenting a computer application, such as a CAD application, to an operator. A representative depiction of a CAD application, as typically displayed on a display device, is shown in FIG. 1. It should be noted that the preferred embodiments of the present invention described herein will be discussed, primarily, in relation to a CAD application, such as the application depicted in FIG. 1, for ease of description and not for purposes of limitation. Thus, the present invention may be utilized with numerous other applications incorporating the use of a mouse-driven cursor, as described in detail hereinafter, with such other applications being considered well within the scope of the present invention.

As depicted in FIG. 1, CAD application 12 provides a computer operator with a grid network 14 formed of a series of horizontal rows 16 and a series of vertical columns 18, with the grid network, oftentimes, being displayed to the operator. A plurality of predetermined points 20 are established at the intersections of the rows and columns, thereby providing the operator with grid-established points at which a cursor, such as cursor 22, may be located when performing various functions provided by the application.

The computer operator typically interfaces with the application by manipulating a mouse-type input device (not shown) that provides x and y coordinate data, corresponding to the movements of the mouse-type input device, as well as function-actuation data, corresponding to actuation of a "left-click" or "right-click" button, for example, to the processor-based system. The processor-based system then evaluates the various data and displays an appropriately positioned cursor 22 on the display. Thus, by moving the mouse-type input device and/or by actuating various actuators of the device, the computer operator may enable various application functionality at various locations about the display.

As mentioned briefly hereinbefore, a cursor may present the operator with mouse twitch or jump. For instance, when the cursor 22 is displayed in position A (FIG. 1), which is defined by a point 20 of the grid network, and an actuator of the mouse-type input device is depressed or the mouse-type input device is inadvertently moved, the cursor may move without additional operator input to position B, which also is defined by a point 20 of the grid network. Thus, a zone 24 surrounds position B, whereby actuation of a mouse function while the cursor is displayed within the zone 24 results in the cursor moving to the center of that zone, e.g., the point 20 of the grid network. Likewise, a zone 26 surrounds position D, whereby actuation of a mouse function while the cursor is displayed within the zone 26, such as when the cursor is being displayed at position C, results in the cursor moving to the center of zone 26.

If the computer operator desires to have the particular mouse functionality enabled at the location A, and not at position B which occupies the center of zone 24, the operator typically must reset the mouse speed and/or sensitivity settings to an appropriate setting so that the position A may be appropriately and/or more conveniently recognized. As described in detail hereinafter, the present invention provides devices, systems and methods for repositioning the cursor (such as to position A) which, otherwise, typically is positioned by utilizing a mouse-type input device.

As mentioned briefly hereinbefore, cursor movement may be facilitated by the present invention which, hereinafter, may be referred to as "the stepper," "stepper system" and/or "method." The stepper system of the present invention can be implemented in hardware, software, firmware, or a combination thereof. In a preferred embodiment, however, the stepper system is implemented as a software package, which can be adaptable to run on different platforms and operating systems as shall be described further herein. In particular, a preferred embodiment of the stepper system, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

In the context of this document, a "computer-readable medium" can be any means that can contain, store, communicate, propagate or transport the program for use by or in connection with the instruction execution system, apparatus, or device. The computer readable medium can be, for example, but not limited to, an electronic, magnetic, optical, electromagnetic, infrared, or semi-conductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable, programmable, read-only memory (EPROM or Flash memory) (magnetic), an optical fiber (optical), and a portable compact disk read-only memory (CDROM) (optical). Note that the computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 2:
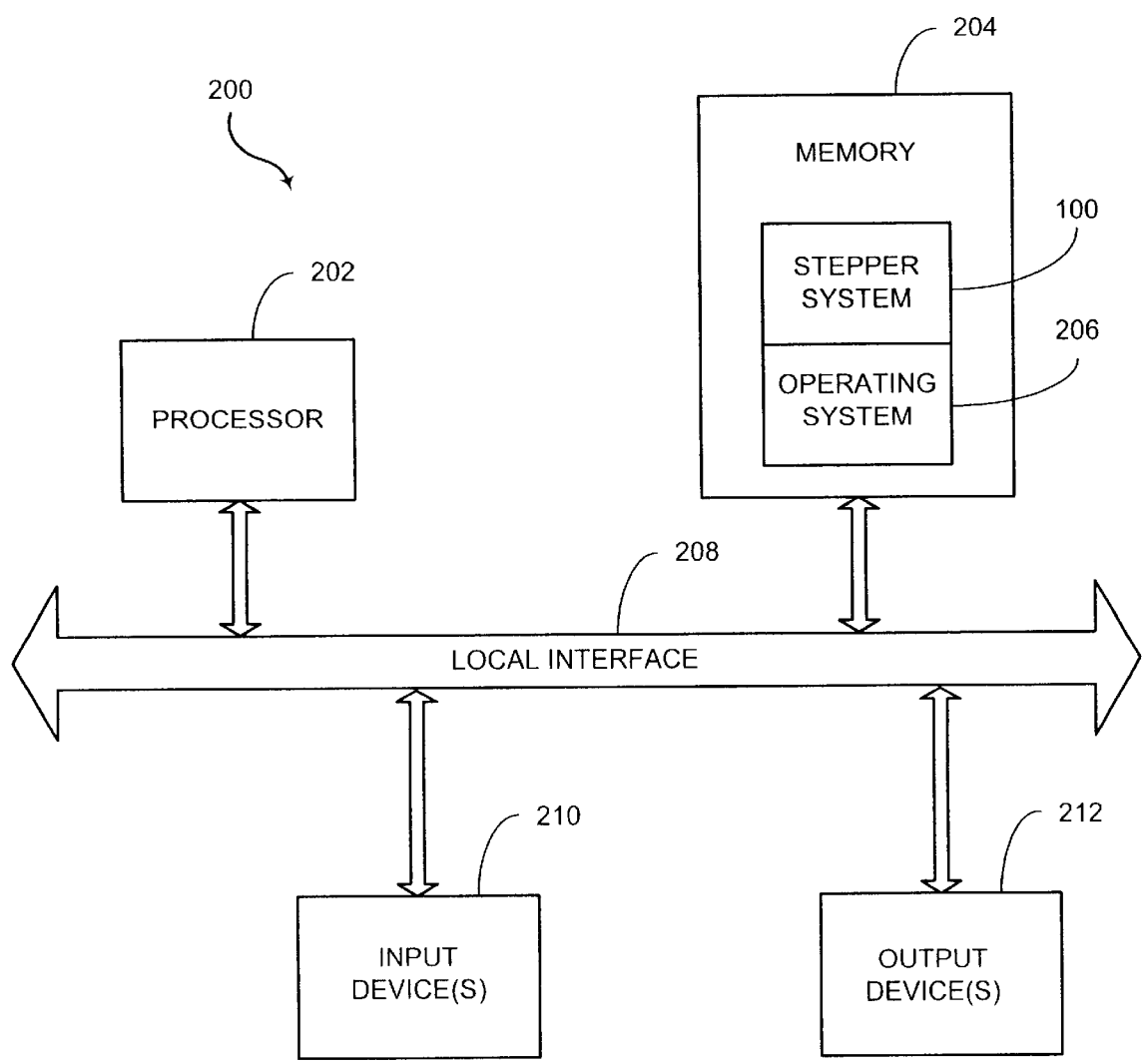
FIG. 2 is a schematic diagram depicting a processor-based system which may be utilized in implementing a preferred embodiment of the preferred invention.

FIG. 2 illustrates a typical computer or processor-based system 200 which may utilize the stepper system 100 of the present invention. As shown in FIG. 2, a computer system 200 generally comprises a processor 202 and a memory 204 with an operating system 206. Herein, the memory 204 may be any combination of volatile and nonvolatile memory elements, such as random access memory or read only memory. The processor 202 accepts instructions and data from memory 204 over a local interface 208, such as a bus(es). The system also includes an input device(s) 210 and an output device(s) 212. Examples of input devices may include, but are not limited to a serial port, a scanner, or a local access network connection. Examples of output devices may include, but are not limited to, a video display, a Universal Serial Bus, or a printer port. Generally, this system may run any of a number of different platforms and operating systems, including, but not limited to, Windows NT™, Unix™, or Sun Solaris™ operating systems. The stepper system 100 of the present invention, the functions of which shall be described hereinafter, resides in memory 204 and is executed by the processor 202.

Figure 3:
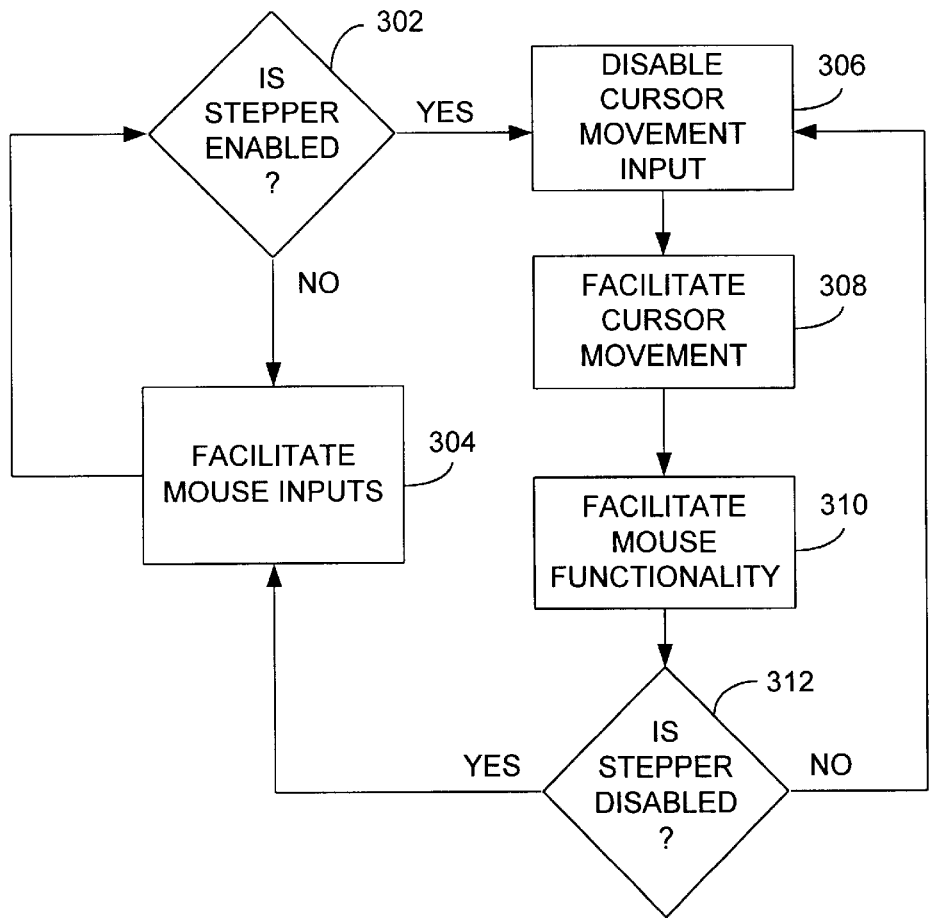
FIG. 3 is a high-level block diagram depicting a preferred method of the present invention.

The flow chart of FIG. 3 shows the functionality and operation of a preferred implementation of the stepper system 100 depicted in FIG. 2. In this regard, each block of the flowchart represents a module segment or portion of code which comprises one or more executable instructions for implementing the specified logical function or functions. It should also be noted that in some alternative implementations, the functions noted in the various blocks may occur out of the order depicted in FIG. 3. For example, two blocks shown in succession in FIG. 3 may in fact be executed substantially concurrently where the blocks may sometimes be executed in the reverse order depending upon the functionality involved.

As depicted in FIG. 3, the process preferably begins at block 302 where a determination is made as to whether the stepper system is enabled. If it is determined that the stepper system is not enabled, the process preferably proceeds to block 304 where mouse movement input and functionality are facilitated, i.e., in a conventional manner. If, however, it is determined (such as in block 302) that the stepper is enabled, the process preferably proceeds to block 306 where cursor movement input from a corresponding mouse-type input device is disabled. At block 308, cursor movement is re-facilitated, such as by providing a re-mapping of a computer keyboard or enabling a stepper input device (described in detail hereinafter). For instance, if cursor movement input is facilitated by a re-mapping of a keyboard, once the keyboard has been remapped, i.e., appropriate keys are designated with corresponding cursor movement functionality, depressing or actuating one or more of the re-mapped keys allows the operator to manipulate the cursor on the display screen. Likewise, if cursor movement input is facilitated by a separate stepper device, actuation of various components of the device allow for manipulation of the cursor (as described in detail hereinafter).

Proceeding to block 310, mouse functionality, e.g., conventional "left-click," "right-click" functionality, etc., is facilitated. So provided, the cursor may be moved by utilizing the stepper system, while performing conventional mouse functionality provided by the mouse-type input device. Proceeding to block 312, a determination is made as to whether the stepper system is disabled. If it is determined that the stepper system is not disabled, the process may proceed back to block 306, and then continue as described hereinbefore. However, if it is determined that the stepper system is disabled, the process preferably proceeds to block 304 where conventional mouse functionality and cursor movement (by utilizing the mouse-type input device) is facilitated.

Figure 4:
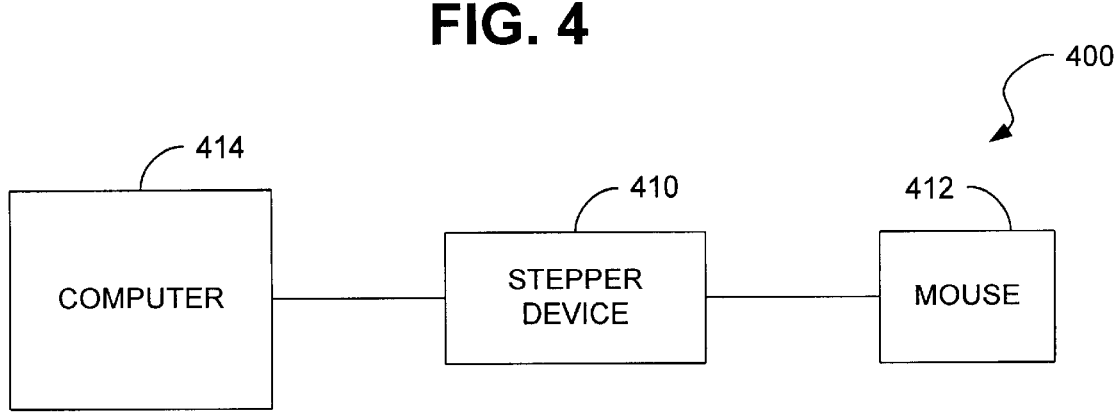
FIG. 4 is a schematic diagram depicting an embodiment of the present invention.

As depicted in FIG. 4, a preferred embodiment 400 of the present invention incorporates the use of a cursor-repositioning or stepper device 410. Stepper device 410 is electrically interconnected intermediate of a mouse-type input device 412 and its associated computer system 414, and preferably incorporates the use of one or more cursor-repositioning components or keys (not shown). Regardless of the particular configured utilized, the stepper device facilitates interception of movement information provided by the mouse-type input device. Activation of the key(s) or actuator(s), such as a joystick, trackball, etc., of the stepper device provides substitute cursor-movement information to the computer, thereby allowing the cursor to be repositioned in response to commands provided by the stepper device. Functional information provided by the mouse-type input device, however, preferably is routed to the computer to facilitate various functionality provided by the mouse-type input device.

Figure 5:
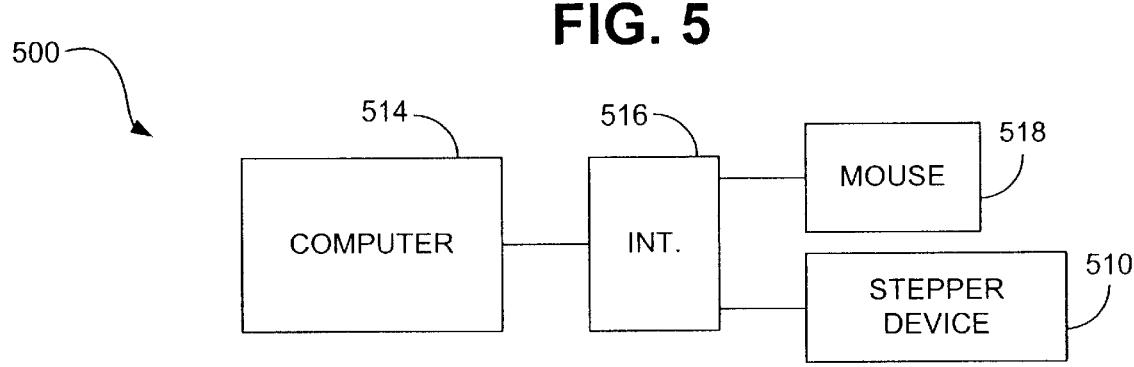
FIG. 5 is a schematic diagram depicting an embodiment of the present invention.

Referring now to FIG. 5, an alternative embodiment 500 also incorporates the use of a stepper device 510. In contrast to the embodiment depicted in FIG. 4, however, system 500 incorporates the use of such a stepper device in a non-in-line arrangement. In particular, the stepper device 510 is configured to provide stepper data to the computer 514 via an interface device or switch box 516 which also is configured to receive input from the mouse-type input device 518. So configured, the switch box facilitates interception of movement information provided by the mouse-type input device, such as when a stepper-enable switch of the stepper device is actuated, for instance. Functional information provided by the mouse-type input device, however, is routed through the switch box and to the computer to facilitate various functionality provided by the mouse-type input device.

Figure 6:
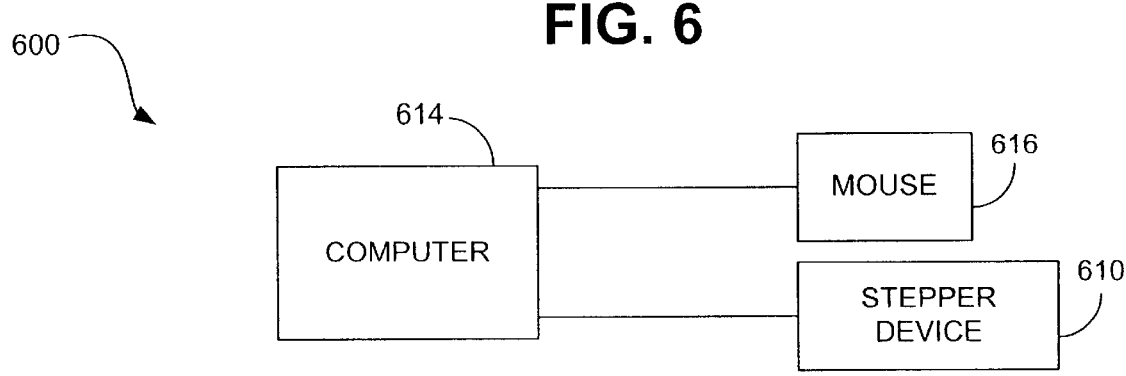
FIG. 6 is a schematic diagram depicting an embodiment of the present invention.

Referring now to FIG. 6, an alternative embodiment 600 incorporates the use of a stepper device 610 which is configured to provide stepper data directly to a computer 614. Preferably, the computer also is adapted to receive input from the mouse-type input device 616. So configured, the movement information provided by the mouse-type input device may be inhibited from influencing movement of the cursor, thereby allowing the stepper device to influence cursor location and movement, and functional information provided by the mouse-type input device continues to provide various mouse functionality. Such a configuration may be implemented by use of a software application, such as the application described in relation to FIG. 3, for instance.

Figure 7:
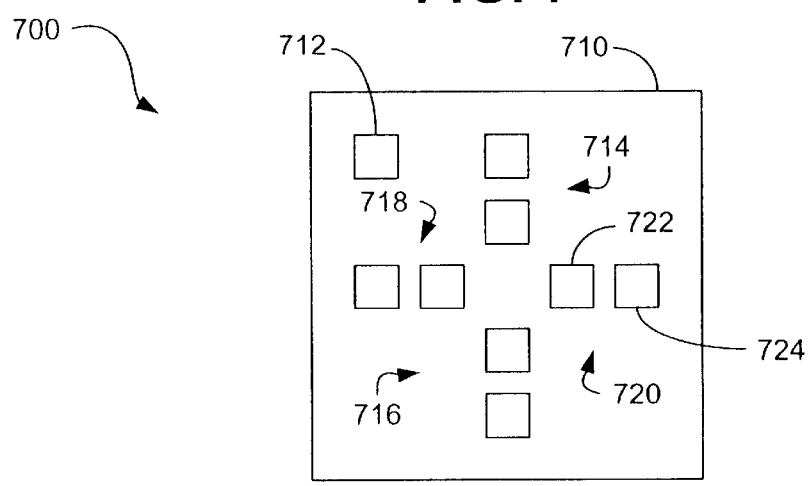
FIG. 7 is a schematic diagram depicting an embodiment of the present invention.

As shown in FIG. 7, a preferred embodiment of a stepper device 700 is depicted that includes a body or platform 710 which serves as a mount for various keys. More specifically, stepper 700 incorporates a stepper enable key 712 (which facilitates stepper-enable functionality, as described hereinbefore), and cursor-repositioning keys, including up keys 714, down keys 716, left keys 718 and right keys 720. Additionally, stepper device 700 includes multiple keys for moving a cursor in each direction, such as keys 722 and 724 for moving the cursor to the right on a display device. The use of such multiple keys allows the stepper to provide for varied incremental movement of a cursor in a particular direction. For instance, actuation of key 722 may facilitate movement of a cursor by a distance x, whereas actuation of key 724 may facilitate movement of the cursor in the same direction by a distance 2x, for example.

Figure 8:
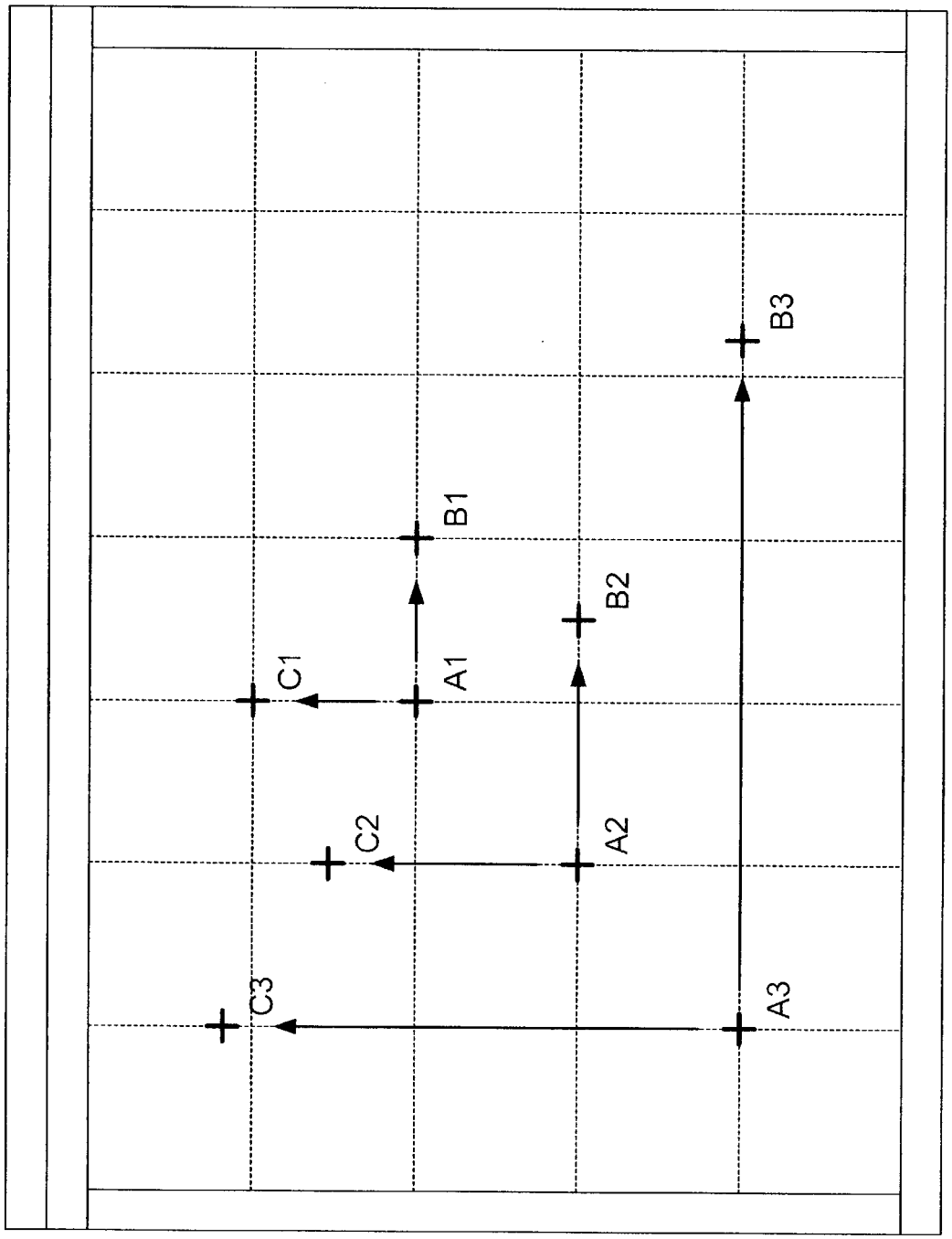
FIG. 8 is a diagram depicting representative cursor movement facilitated by a preferred embodiment of the present invention.

Referring now to FIG. 8, the present invention facilitates movement of a cursor, such as from location A1 to B1 (or C1). Additionally, some embodiments of the stepper may provide enhanced functionality as compared to a conventional mouse. In particular, the stepper may interface with a computer application such that manipulation of the cursor by the stepper allows the cursor to be moved to and reside at a location which is intermediate adjacent grid-established cursor locations of the computer application. For instance, as depicted in FIG. 8, the stepper may allow the cursor to be moved from position A2 to B2 (or C2), and thereafter facilitates full functionality of the cursor at that location. Moreover, some embodiments of the stepper may provide for a "slide" function, whereby actuation of the stepper allows a cursor to be moved continuously, i.e., in visually indiscernible increments across a display screen. Thus, a cursor may be moved from location A3 to location B3 (or C3) such as by depressing a corresponding key and holding the key in a depressed or actuated position until the cursor moves or slides to a desired location. Once reaching the desired location, the key may be released, thereby, halting the movement of the cursor at its current location. Once again, full functionality provided by the mouse may then be provided to the cursor at its new location.

It should be noted that the stepper does not necessarily limit cursor movement within a particular application window. More specifically, in preferred embodiments, the cursor may be moved between and among various application windows displayed on a display screen or screens and is particularly well suited for manipulating a cursor between the various screens of a multi-screen display. As cursor movement control is established by the stepper, a uniformity of mouse control is provided which allows an operator to effectively utilize a cursor with various applications.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A method for interfacing with a computer application, the computer application being adapted to display a cursor within a display area of a display device of a computer, the computer having a mouse-type input device associated therewith for providing movement information and functional information corresponding to the cursor such that the cursor is movable about the display area in response to the movement information and is adapted to provide selected functionality in response to the functional information, said method comprising:

providing keys communicating with the computer, each of the keys corresponding to a direction and magnitude of movement of the cursor, a first of the keys corresponding to a first direction and a first magnitude of movement of the cursor, a second of the keys corresponding to the first direction and a second magnitude of movement of the cursor, the first magnitude being different than the second magnitude;

preventing movement information provided by the mouse-type input device from influencing movement of the cursor on the display device;

repositioning the cursor without utilizing the mouse-type input device by actuating one of the keys; and enabling functional information, provided by the mouse-type input device, to provide selected functionality of the cursor.

2. The method of claim 1, wherein the step of repositioning the cursor comprises the steps of:

providing a stepper device electrically communicating with the computer, the stepper device including the keys;

determining whether a stepper-enable function of the computer is enabled; and if the stepper-enable function is enabled, allowing repositioning of the cursor with the stepper device.

3. The method of claim 1, wherein the step of preventing movement information comprises the steps of:

intercepting movement information provided by the mouse-type input device.

4. The method of claim 1, wherein the computer has a keyboard input device including the keys; and wherein the step of preventing movement information comprises the step of:
re-mapping the keyboard such that actuation of the first key prevents movement information provided by the mouse-type input device from influencing movement of the cursor on the display device.

5. The method of claim 4, wherein the step of repositioning the cursor comprises the step of:

actuating at least one of the keys of the keyboard such that the cursor is moved about the display device.

6. A computer readable medium having a computer program for interfacing with a computer application, the computer application being adapted to display a cursor within a display area of a display device of a computer, the computer having keys and a mouse-type input device associated therewith for providing movement information and functional information corresponding to the cursor such that the cursor is movable about the display area in response to the movement information and is adapted to provide selected functionality in response to the functional information, said computer readable medium comprising:

logic configured to prevent movement information provided by the mouse-type input device from influencing movement of the cursor on the display device;

logic configured to re-map the keys such that a first of the keys corresponds to a first direction and a first magnitude of movement of the cursor and a second of the keys corresponds to the first direction and a second magnitude of movement of the cursor, the first magnitude being different than the second magnitude;

logic configured to reposition the cursor using the keys and without utilizing the mouse-type input device; and logic configured to enable functional information, provided by the mouse-type input device, to provide selected functionality of the cursor.

7. The method of claim 6, wherein the logic configured to prevent movement information comprises logic configured to re-map a third key such that actuation of the third key prevents movement information provided by the mouse-type input device from influencing movement of the cursor on the display device.

8. An input device for interfacing with a computer application, the computer application being adapted to display a cursor within a display area of a display device of a computer, the computer having a mouse-type input device associated therewith for providing movement information and functional information corresponding to the cursor such that the cursor is movable about the display area in response to the movement information and is adapted to provide selected functionality in response to the functional information, said input device comprising:

a stepper-enable switch configured to prevent movement information provided by the mouse-type input device from influencing movement of the cursor on the display device and to enable functional information, provided by the mouse-type input device, to provide selected functionality of the cursor; and a plurality of cursor-repositioning keys configured to reposition the cursor when movement information provided by the mouse-type input device is prevented from influencing movement of the cursor on the display device, each of the keys corresponding to a direction and magnitude of movement of the cursor, a first of the keys corresponding to a first direction and a first magnitude of movement of the cursor, a second of the keys corresponding to the first direction and a second magnitude of movement of the cursor, the first magnitude being different than the second magnitude.

9. The input device of claim 8, further comprising:

means for intercepting movement information provided by the mouse-type input device.

10. The input device of claim 8, wherein the computer has a keyboard associated therewith, and wherein said plurality of cursor-repositioning keys correspond to a subset of keys of the keyboard.

11. A computer system for operating a computer application, said computer system comprising:

a display device having a display area configured to display graphical information thereon;

a mouse-type input device configured to provide a user-interface with the computer application, the computer application being adapted to display a cursor within said display area of said display device, said mouse-type input device being configured to provide movement information and functional information corresponding to the cursor such that the cursor is movable about said display area in response to said movement information and being configured to provide selected functionality to the cursor in response to said functional information;

a stepper device configured to electrically communicate with the computer, said stepper device having a stepper-enable switch configured to prevent movement information provided by the mouse-type input device from influencing movement of the cursor on the display device and to enable functional information, provided by the mouse-type input device, to provide selected functionality of the cursor; and a plurality of cursor-repositioning keys configured to reposition the cursor when movement information provided by the mouse-type input device is prevented from influencing movement of the cursor on the display device, each of the keys corresponding to a direction and magnitude of movement of the cursor, a first of the keys corresponding to a first direction and a first magnitude of movement of the cursor, a second of the keys corresponding to the first direction and a second magnitude of movement of the cursor, the first magnitude being different than the second magnitude.

12. The computer system of claim 11, wherein the computer system has a keyboard associated therewith, and wherein said plurality of cursor-repositioning keys correspond to a subset of keys of the keyboard.

13. The computer system of claim 11, wherein the stepper device includes said plurality of cursor-repositioning keys.

* * * * *